United States Patent
Lee et al.

(10) Patent No.: US 12,471,626 B2
(45) Date of Patent: Nov. 18, 2025

(54) AEROSOL GENERATING DEVICE INCLUDING VIBRATOR AND METHOD OF OPERATING THE SAME

(71) Applicant: KT&G CORPORATION, Daejeon (KR)

(72) Inventors: Wonkyeong Lee, Gyeonggi-do (KR); Jae Sung Choi, Gyeonggi-do (KR); Heon Jun Jeong, Seoul (KR)

(73) Assignee: KT&G CORPORATION, Daejeon (KR)

( * ) Notice: Subject to any disclaimer, the term of this patent is extended or adjusted under 35 U.S.C. 154(b) by 0 days.

(21) Appl. No.: 17/776,855

(22) PCT Filed: Jan. 27, 2022

(86) PCT No.: PCT/KR2022/001471
§ 371 (c)(1),
(2) Date: May 13, 2022

(87) PCT Pub. No.: WO2022/203187
PCT Pub. Date: Sep. 29, 2022

(65) Prior Publication Data
US 2024/0156157 A1    May 16, 2024

(30) Foreign Application Priority Data

Mar. 26, 2021 (KR) .......................... 10-2021-0039727
May 18, 2021 (KR) .......................... 10-2021-0064217

(51) Int. Cl.
A24F 40/05    (2020.01)
A24F 40/10    (2020.01)
(Continued)

(52) U.S. Cl.
CPC .............. *A24F 40/05* (2020.01); *A24F 40/10* (2020.01); *A24F 40/42* (2020.01); *A24F 40/51* (2020.01);
(Continued)

(58) Field of Classification Search
None
See application file for complete search history.

(56) References Cited

U.S. PATENT DOCUMENTS

2018/0090923 A1    3/2018    Li et al.
2019/0159519 A1    5/2019    Bowen et al.
(Continued)

FOREIGN PATENT DOCUMENTS

CN    105661649 A    6/2016
CN    206227717 U    6/2017
(Continued)

OTHER PUBLICATIONS

International Search Report dated May 13, 2022 in Application No. PCT/KR2022/001471.
(Continued)

*Primary Examiner* — Phu H Nguyen
(74) *Attorney, Agent, or Firm* — Sughrue Mion, PLLC (57) ABSTRACT

According to an embodiment, an aerosol generating device includes a reservoir storing an aerosol generating material, a vibrator generating ultrasonic vibration to atomize the aerosol generating material into an aerosol, a drive circuit applying an alternating current (AC) voltage to the vibrator, a feedback circuit outputting a voltage proportional to a current supplied to the drive circuit, and a processor controlling a pulse width modulation (PWM) signal applied to the drive circuit, such that a value corresponding to the voltage is in a preset range defined by a first upper limit and a first lower limit.

8 Claims, 5 Drawing Sheets

(51) Int. Cl.
    *A24F 40/42*     (2020.01)
    *A24F 40/51*     (2020.01)
    *A24F 40/53*     (2020.01)
    *B05B 17/06*     (2006.01)
    *B06B 1/02*     (2006.01)

(52) U.S. Cl.
    CPC .............. *A24F 40/53* (2020.01); *B05B 17/06* (2013.01); *B06B 1/0215* (2013.01); *B06B 2201/77* (2013.01)

(56) References Cited

U.S. PATENT DOCUMENTS

| | | |
|---|---|---|
| 2019/0350257 A1 | 11/2019 | Sur |
| 2020/0146353 A1 | 5/2020 | Liu et al. |
| 2020/0237010 A1 | 7/2020 | Yamada et al. |
| 2020/0352246 A1 | 11/2020 | Yamada et al. |
| 2020/0375258 A1 | 12/2020 | Mizuguchi et al. |
| 2021/0020823 A1 | 1/2021 | Kang et al. |
| 2021/0030070 A1 | 2/2021 | Sun et al. |
| 2021/0120880 A1 | 4/2021 | Liu et al. |

FOREIGN PATENT DOCUMENTS

| | | |
|---|---|---|
| CN | 108420116 A | 8/2018 |
| CN | 109007974 A | 12/2018 |
| CN | 208367566 U | 1/2019 |
| CN | 110299904 A | 10/2019 |
| CN | 110545682 A | 12/2019 |
| CN | 110810927 A | 2/2020 |
| CN | 210672083 U | 6/2020 |
| CN | 111655053 A | 9/2020 |
| CN | 111802709 A | 10/2020 |
| EP | 3299053 A1 | 3/2018 |
| EP | 3569078 A1 | 11/2019 |
| EP | 3 750 413 A2 | 12/2020 |
| KR | 10-2020-0038501 A | 4/2020 |
| KR | 10-2020-0098679 A | 8/2020 |

OTHER PUBLICATIONS

Extended European Search Report dated Nov. 11, 2022 in Application No. 22722114.0.
Communication dated Jun. 28, 2024, issued in Chinese Application No. 202280001702.4.

AEROSOL GENERATING DEVICE INCLUDING VIBRATOR AND METHOD OF OPERATING THE SAME

CROSS REFERENCE TO RELATED APPLICATIONS

This application is a National Stage of International Application No. PCT/KR2022/001471 filed Jan. 27, 2022, claiming priority based on Korean Patent Application No. 10-2021-0039727 filed Mar. 26, 2021 and Korean Patent Application No. 10-2021-0064217 filed May 18, 2021.

TECHNICAL FIELD

The present disclosure relates to an aerosol generating device including a vibrator and a method of operating the aerosol generating device.

BACKGROUND ART

There is an increasing demand for an aerosol generating device that generates an aerosol in a non-combustible manner as an alternative to a traditional cigarette. For example, an aerosol generating device may generate an aerosol without combustion from an aerosol generating material, and supply the generated aerosol to a user.

DISCLOSURE OF INVENTION

Technical Problem

An aerosol generating device using ultrasonic vibration may generate ultrasonic vibration by applying an alternating current (AC) voltage to a vibrator and may divide an aerosol generating material into fine particles through the ultrasonic vibration. As the aerosol generating material is divided into fine particles and released, an aerosol may be generated. An aerosol generated by ultrasonic vibration may be greatly affected by characteristics of a vibrator. Therefore, a technique for acquiring information on the characteristics or a state of the vibrator in real time and using the acquired information to control the aerosol generating device may be required.

Various embodiments provide an aerosol generating device including a vibrator and a method of operating the aerosol generating device. Technical problems to be solved by the present disclosure are not limited to the technical problems described above, and other technical problems may be inferred from the following embodiments.

Solution to Problem

An aerosol generating device according to one embodiment includes a reservoir for storing an aerosol generating material, a vibrator generating ultrasonic vibration to atomize the aerosol generating material into an aerosol, a drive circuit applying an alternating current (AC) voltage to the vibrator, a feedback circuit outputting a voltage proportional to a current supplied to the drive circuit, and a processor controlling a pulse width modulation (PWM) signal applied to the drive circuit such that a value corresponding to the voltage is in a preset range defined by a first upper limit and a first lower limit.

Advantageous Effects of Invention

The present disclosure may provide an aerosol generating device including a vibrator and a method of operating the aerosol generating device. For example, an aerosol generating device according to an embodiment of the present disclosure may feed back a voltage proportional to a current supplied to a drive circuit for applying an AC voltage to a vibrator by using a feedback circuit and control a PWM signal applied to the drive circuit such that a value corresponding to the voltage is in a preset range defined by a first upper limit and a first lower limit. Accordingly, characteristics of the vibrator may be maintained at a level at which stable atomization of an aerosol may be performed.

In addition, an aerosol generating device according to an embodiment of the present disclosure may determine that a cartridge including the vibrator is not coupled to a main body when the value corresponding to the voltage is less than a second lower limit lower than the first lower limit. The aerosol generating device may prevent unnecessary power consumption by stopping at least one operation when it is determined that the cartridge is not coupled to the main body.

In addition, when the value corresponding to the voltage reaches a second upper limit greater than the first upper limit, the aerosol generating device according to an embodiment of the present disclosure may determine that the aerosol generating material is insufficient or the characteristics of the vibrator are changed. A change in the characteristics of the vibrator may indicate that the vibrator is in an overheated state or is damaged as a temperature increases above a Curie temperature. When it is determined that the aerosol generating material is insufficient or the characteristics of the vibrator are changed, the aerosol generating device may stop at least one operation or output a notification that the cartridge or the vibrator needs to be replaced.

In addition, according to an embodiment of the present disclosure, thresholds (for example, the first upper limit and the first lower limit) for determining an optimal state of the aerosol generating device may be set to be different from thresholds (for example, the second upper limit and the second lower limit) for determining an inoperable state of the aerosol generating device. Accordingly, the aerosol generating device is not just controlled to be in an operable state but may be controlled to be in the optimal state in which stable atomization of the aerosol may be performed.

According to one embodiment of the present disclosure, a feedback circuit may include an operational amplifier having a non-inverting input terminal to which a drive voltage is applied, an inverting input terminal connected to an input terminal of the drive circuit, and an output terminal. In addition, the feedback circuit may include a first resistor and a first capacitor connected in parallel between the non-inverting input terminal and the inverting input terminal. The operational amplifier may amplify a voltage between the non-inverting input terminal and the inverting input terminal in a range acceptable by a processor and output the amplified voltage through the output terminal.

The first resistor may have a resistance value small enough to transfer a drive voltage applied to the non-inverting input terminal to the input terminal of the drive circuit without a substantial voltage drop. In addition, the first capacitor may reduce noise while a voltage between the non-inverting input terminal and the inverting input terminal is amplified by the operational amplifier. As such, the feedback circuit may feed back characteristics of the vibrator without substantially affecting the process in which a drive voltage is applied to the drive circuit.

In addition, the feedback circuit may further include an RC filter including a second resistor and a second capacitor connected in series to the output terminal and providing an output voltage of the feedback circuit through the second capacitor. Accordingly, noise in the process of outputting a voltage through the feedback circuit may be further reduced, and the aerosol generating device may be accurately controlled.

BEST MODE FOR CARRYING OUT THE INVENTION

According to an aspect of the present disclosure, an aerosol generating device may include a reservoir for storing an aerosol generating material, a vibrator generating ultrasonic vibration to atomize the aerosol generating material into an aerosol, a drive circuit applying an alternating current (AC) voltage to the vibrator, a feedback circuit outputting a voltage proportional to a current supplied to the drive circuit, and a processor controlling a pulse width modulation (PWM) signal applied to the drive circuit such that a value corresponding to the voltage is in a preset range defined by a first upper limit and a first lower limit.

The aerosol generating device may further include a sensor configured to detect puff of a user, and the processor may apply the PWM signal to the drive circuit based on detection of a start of the puff and control the PWM signal such that a time taken for the value corresponding to the voltage to reach the first upper limit is substantially constant for each puff of the user.

The aerosol generating device may further include a cartridge including the reservoir and the vibrator, and a main body including the drive circuit, the feedback circuit, and the processor, and detachably coupled to the cartridge, and based on the value corresponding to the voltage being less than a second lower limit lower than the first lower limit, the processor may determine that the cartridge is not coupled to the main body.

Based on the value corresponding to the voltage reaching a second upper limit greater than the first upper limit, the processor may determine that the aerosol generating material is insufficient or that characteristics of the vibrator are changed.

The feedback circuit may include an operational amplifier having a non-inverting input terminal to which a drive voltage is applied, an inverting input terminal connected to an input terminal of the drive circuit, and an output terminal, and a first resistor and a first capacitor which are connected in parallel between the non-inverting input terminal and the inverting input terminal, and the operational amplifier may amplify a voltage between the non-inverting input terminal and the inverting input terminal in a range acceptable by the processor and output the amplified voltage through the output terminal.

The first resistor may have a resistance value small enough to transfer the drive voltage applied to the non-inverting input terminal to the input terminal of the drive circuit without a substantial voltage drop.

The feedback circuit may further include an RC filter including a second resistor and a second capacitor which are connected in series to the output terminal and providing an output voltage of the feedback circuit through the second capacitor.

The processor may acquire the value corresponding to the voltage by converting the voltage output from the feedback circuit into a digital value by using an analog-to-digital converter.

The drive circuit may include an input terminal to which a drive voltage is applied, an inductor having a terminal connected to the input terminal, a transistor connected to the other terminal of the inductor and configured to perform switching such that a current flowing through the inductor flows to one of the vibrator and a ground, and a power field effect transistor (FET) configured to generate a switching voltage based on the PWM signal, and the AC voltage may be applied to the vibrator as the transistor performs the switching according to the switching voltage.

In addition, according to another aspect of the present disclosure, a method of operating an aerosol generating device may include feeding back a voltage proportional to a current supplied to a drive circuit for applying an alternating current (AC) voltage to a vibrator by using a feedback circuit, and controlling a pulse width modulation (PWM) signal applied to the drive circuit by using a processor such that a value corresponding to the voltage is in a preset range defined by a first upper limit and a first lower limit.

MODE FOR THE INVENTION

With respect to the terms used to describe the various embodiments, general terms which are currently and widely used are selected in consideration of functions of structural elements in the various embodiments of the present disclosure. However, meanings of the terms can be changed according to intention, a judicial precedence, the appearance of new technology, and the like. In addition, there is a term randomly selected by the applicant in a specific case, and in this case, meaning thereof is described in detail in the description of the corresponding portion. Therefore, the terms used in the present disclosure should be defined based on the meaning of the term and all contents of the present disclosure, rather than a simple name of the term.

In addition, unless explicitly described to the contrary, the word "comprise" and variations such as "comprises" or "comprising" will be understood to imply the inclusion of stated elements but not the exclusion of any other elements. In addition, terms such as " . . . unit", " . . . portion", and " . . . module" described in the specification indicate a unit for processing at least one function or operation, which is implemented by hardware, software, or a combination thereof.

As used in the present disclosure, expressions such as "at least one" define the entire list of elements, when preceding the list of elements, not individual elements of the list. For example, the expression "at least one of a, b, and c" may be understood to include "a", "b", "c", "a and b", "a and c", "b and c", or "a, b, and c".

Hereinafter, the present disclosure will now be described more fully with reference to the accompanying drawings, in which example embodiments of the present disclosure are shown such that one of ordinary skill in the art may easily work the present disclosure. The disclosure may, however, be embodied in many different forms and should not be construed as being limited to the embodiments set forth herein.

Figure 1:
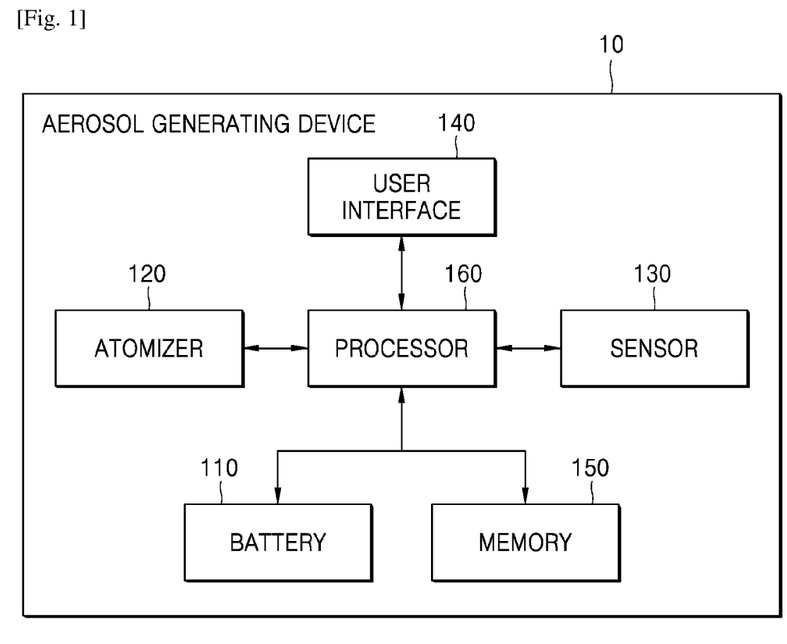
FIG. 1 is a block diagram of an aerosol generating device according to an embodiment.

FIG. 1 is a block diagram of an aerosol generating device according to an embodiment.

Referring to FIG. 1, the aerosol generating device 10 may include a battery 110, an atomizer 120, a sensor 130, a user interface 140, a memory 150, and a processor 160. However, an internal structure of the aerosol generating device 10 is not limited to the structure illustrated in FIG. 1. Those skilled in the art related to the present embodiment may be understand that some of the hardware components illustrated in FIG. 1 may be omitted or a new configuration may be further added thereto according to a design of the aerosol generating device 10.

For example, the aerosol generating device 10 may include a main body, and in this case, hardware components included in the aerosol generating device 10 may be located on the main body.

In another embodiment, the aerosol generating device 10 may include a main body and a cartridge, and hardware components included in the aerosol generating device 10 may be located distributively in the main body and the cartridge. Alternatively, at least some of the hardware components included in the aerosol generating device 10 may be located in each of the main body and the cartridge.

Hereinafter, operations of respective components are described without limiting positions of the respective components included in the aerosol generating device 10.

The battery 110 supplies power used to operate the aerosol generating device 10. For example, the battery 110 may supply power to enable the atomizer 120 to atomize an aerosol generating material. In addition, the battery 110 may supply power required for operations of other hardware components, which are included in the aerosol generating device 10, for example, the sensor 130, the user interface 140, the memory 150, and the processor 160. The battery 110 may be a rechargeable battery or a disposable battery.

For example, the battery 110 may include a nickel-based battery (for example, a nickel-metal hydride battery or a nickel-cadmium battery), or a lithium-based battery (for example, a lithium-cobalt battery, a lithium-phosphate battery, a lithium titanate battery, a lithium-ion battery, or a lithium-polymer battery). However, the type of the battery 110 that may be used in the aerosol generating device 10 is not limited to the batteries described above. If necessary, the battery 110 may also include an alkaline battery or a manganese battery.

The atomizer 120 may receive power from the battery 110 under the control of the processor 160. The atomizer 120 may receive power from the battery 110 to atomize an aerosol generating material stored in the aerosol generating device 10.

The atomizer 120 may be located in the main body of the aerosol generating device 10. Alternatively, when the aerosol generating device 10 includes a main body and a cartridge, the atomizer 120 may be located in the cartridge or may be divided to be located in the main body and the cartridge. When the atomizer 120 is located in the cartridge, the atomizer 120 may receive power from the battery 110 located in at least one of the main body and the cartridge. In addition, when the atomizer 120 is divided to be separately located in the main body and the cartridge, components of the atomizer 120 which require power may receive the power from the battery 110 located in at least one of the main body and the cartridge.

The atomizer 120 generates an aerosol from an aerosol generating material in the cartridge. An aerosol indicates floating particles in which liquid and/or solid fine particles are dispersed in a gas. Accordingly, an aerosol generated from the atomizer 120 may indicate a mixture of vaporized particles generated from an aerosol generating material and air. For example, the atomizer 120 may convert a phase of the aerosol generating material into a gas phase through vaporization and/or sublimation. In addition, the atomizer 120 may generate an aerosol by changing the aerosol generating material in a liquid phase and/or a solid phase into fine particles.

For example, the atomizer 120 may generate an aerosol from an aerosol generating material through an ultrasonic vibration method. The ultrasonic vibration method may refer to a method of generating an aerosol by atomizing an aerosol generating material by using ultrasonic vibration generated by a vibrator (e.g., a kind of a transducer).

Although not illustrated in FIG. 1, the atomizer 120 may optionally include a heater capable of heating an aerosol generating material by generating heat. An aerosol generating material may be heated by a heater to generate an aerosol.

The heater may be formed of any suitable electrically resistive material. For example, the suitable electrically resistive material may be a metal or a metal alloy including titanium, zirconium, tantalum, platinum, nickel, cobalt, chromium, hafnium, niobium, molybdenum, tungsten, tin, gallium, manganese, iron, copper, stainless steel, or nichrome, but is not limited thereto. In addition, the heater may be composed of a metal heating wire, a metal heating plate on which an electrically conductive track is arranged, a ceramic heating element, or so on but is not limited thereto.

For example, in one embodiment, the heater may be a portion of the cartridge. In addition, the cartridge may include a liquid delivery means and a reservoir, which are described below. An aerosol generating material included in the reservoir may be moved to the liquid delivery means, and the heater may heat the aerosol generating material absorbed in the liquid delivery means to generate an aerosol. For example, the heater may be wound around the liquid delivery means or may be arranged adjacent to the liquid delivery means.

In another example, the aerosol generating device 10 may include an accommodation space capable of accommodating a cigarette, and a heater may heat a cigarette inserted in the accommodation space of the aerosol generating device 10. As a cigarette is accommodated in the accommodation space of the aerosol generating device 10, a heater may be located inside and/or outside the cigarette. Accordingly, the heater may heat an aerosol generating material in the cigarette to generate an aerosol.

In addition, the heater may include an induction heating type heater. The heater may include an electrically conductive coil for inducing an alternating magnetic field, and the cigarette or cartridge may include a susceptor capable of being heated by the alternating magnetic field.

The aerosol generating device 10 may include at least one sensor 130. A sensing result obtained by the at least one sensor 130 may be transmitted to the processor 160, and the processor 160 may control the aerosol generating device 10 to perform various functions such as an operation control of the atomizer 120, restriction of smoking, determination of whether or not a cartridge (or a cigarette) is inserted, and notification display, according to the sensing result.

For example, the at least one sensor 130 may include a puff detection sensor. The puff detection sensor may detect a puff of a user based on at least one of a change in a flow rate of an externally introduced airflow, a change in pressure, and detection of sound. The puff detection sensor may detect a start time and an end time of the puff of the user, and the processor 160 may determine a puff period and a non-puff period according to the detected puff start time and the detected puff end time.

In addition, the at least one sensor 130 may include a user input sensor. The user input sensor may include a sensor capable of receiving a user input, such as a switch, a physical button, or a touch sensor. For example, the touch sensor may include a capacitive sensor capable of detecting a user input by detecting a change in capacitance occurring when a user touches a certain region formed of a metal material. The processor 160 may determine whether a user input is made based on the change in capacitance detected by the capacitive sensor. When the change in capacitance exceeds a preset threshold, the processor 160 may determine that the user input has been made.

In addition, the at least one sensor 130 may include a motion sensor. Information on a movement of the aerosol generating device 10, such as inclination, movement speed, and acceleration of the aerosol generating device 10 may be acquired by the motion sensor. For example, the motion sensor may acquire information on a state in which the aerosol generating device 10 moves, a stationary state of the aerosol generating device 10, a state in which the aerosol generating device 10 is inclined at an angle within a predetermined range for puff, and a state in which the aerosol generating device 10 is inclined at an angle different from the angle during a puff operation between respective puff operations. The motion sensor may measure motion information of the aerosol generating device 10 through various methods known in the art. For example, the motion sensor may include an acceleration sensor capable of measuring acceleration in three directions of an x-axis, a y-axis, and a z-axis, and a gyro sensor capable of measuring angular velocity in three directions.

In addition, the at least one sensor 130 may include a proximity sensor. The proximity sensor refers to a sensor that detects presence of an approaching object, an object in the proximity, or a distance from the object by using an electromagnetic field, infrared rays, or so on without mechanical contact. Thus, the proximity sensor may detect a user approaching the aerosol generating device 10.

In addition, the at least one sensor 130 may include an image sensor. The image sensor may include, for example, a camera for acquiring an image of an object. The image sensor may recognize an object based on an image acquired by the camera. The processor 160 may analyze the image acquired by the image sensor to determine whether a user is in a situation for using the aerosol generating device 10. For example, when a user brings the aerosol generating device 10 close to the lip to use the aerosol generating device 10, the image sensor may acquire an image of the lip. The processor 160 may analyze the acquired image, and when it is determined that the image is the lip, the processor 160 determines that the user is in a situation for using the aerosol generating device 10. The aerosol generating device 10 may operate the atomizer 120 in advance or preheat the heater.

In addition, the at least one sensor 130 may include a consumable detachment sensor capable of detecting installation or removal of a consumable (for example, a cartridge, a cigarette, or so on) that may be used in the aerosol generating device 10. For example, the consumable detachment sensor may detect whether the consumable is in contact with the aerosol generating device 10 or may determine whether the consumable is removed by the image sensor. In addition, the consumable detachment sensor may include an inductance sensor for detecting a change in inductance value of a coil that may interact with a marker of the consumable, or a capacitance sensor for detecting a change in capacitance value of a capacitor that may interact with the marker of the consumable.

In addition, the at least one sensor 130 may include a temperature sensor. The temperature sensor may detect a temperature of a vibrator or a heater (or an aerosol generating material) of the atomizer 120. The aerosol generating device 10 may include a separate temperature sensor for detecting a temperature of the vibrator or the heater, or the heater itself may serve as a temperature sensor instead of including the separate temperature sensor. Alternatively, the separate temperature sensor may be further included in the aerosol generating device 10 while the heater functions as a temperature sensor. In addition, the temperature sensor may also detect temperatures of internal components such as a printed circuit board (PCB) and a battery of the aerosol generating device 10 as well as a temperature of a vibrator or a heater.

In addition, the at least one sensor 130 may include various sensors that acquire information on a surrounding environment of the aerosol generating device 10. For example, the at least one sensor 130 may include a temperature sensor for detecting a temperature of a surrounding environment, a humidity sensor for detecting humidity of the surrounding environment, an atmospheric pressure sensor for detecting a pressure of the surrounding environment, and so on.

The sensor 130 that may be provided in the aerosol generating device 10 is not limited to the sensors described above and may further include various sensors. For example, the aerosol generating device 10 may include a fingerprint sensor for acquiring fingerprint information from a user's finger for user authentication and security, an iris recognition sensor for analyzing an iris pattern of the pupil, a vein recognition sensor for detecting the amount of infrared absorption of reduced hemoglobin in vein from an image obtained by capturing the palm, a facial recognition sensor for recognizing feature points of eyes, a nose, a mouth, a facial contour, and so on through a two-dimensional (2D) or three-dimensional (3D) method, a radiofrequency identification (RFID) sensor, and so on.

The aerosol generating device 10 may selectively include only some of the examples of the various sensors 130 described above. In other words, the aerosol generating device 10 may combine pieces of information acquired by at least one sensor among the sensors described above.

The user interface 140 may provide information on a state of the aerosol generating device 10 to a user. The user interface 140 may include various interfacing means such as a display or a lamp for outputting visual information, a motor for outputting tactile information, a speaker for outputting sound information, terminals for data communication with input/output (I/O) interfacing means (for example, buttons or a touch screen) for receiving information input from a user or outputting information to the user or for receiving charging power, and a communication interface for performing wireless communication (for example, WI-FI, WI-FI Direct, Bluetooth, near-field communication (NFC), and so on) with an external device.

However, the aerosol generating device 10 may optionally include only some of the various examples of the user interface 140 described above.

The memory 150 may store various data processed by the aerosol generating device 10, data processed by the processor 160, and data to be processed by the processor 160. The memory 150 includes various memory devices, for example, random access memory (RAM) such as dynamic random access memory (DRAM) or static random access memory (SRAM), read-only memory (ROM), electrically erasable programmable read-only memory (EEPROM), and so on.

The memory 150 may store operation time of the aerosol generating device 10, the greatest number of puffs, the current number of puffs, at least one temperature profile, data on a user's smoking pattern, and so on.

The processor 160 controls all operations of the aerosol generating device 10. The processor 160 may be implemented by an array of a plurality of logic gates or may be implemented by a combination of a microprocessor and a memory in which a program executable by the microprocessor is stored. In addition, it can be understood by those skilled in the art that the processor 160 may also be implemented by other types of hardware.

The processor 160 analyzes sensing results of the at least one sensor 130 and controls a process to be subsequently performed. For example, the processor 160 may control power supplied to the atomizer 120 to start or end an operation of the atomizer 120 based on the sensing result of the at least one sensor 130. In addition, the processor 160 may control the amount of power supplied to the atomizer 120 and a power supply time such that the atomizer 120 may generate an appropriate amount of aerosol based on the sensing results of the at least one sensor 130. For example, the processor 160 may control a current or a voltage supplied to the vibrator such that the vibrator of the atomizer 120 vibrates at a preset frequency.

In one embodiment, the processor 160 may initiate an operation of the atomizer 120 after receiving a user input for the aerosol generating device 10. In addition, the processor 160 may start the operation of the atomizer 120 when a puff of a user is detected by the puff detection sensor. In addition, the processor 160 may stop supplying power to the atomizer 120 when the number of puffs reaches a preset number after counting the number of puffs with the puff detection sensor.

The processor 160 may control the user interface 140 based on the sensing results of the at least one sensor 130. For example, when the number of puffs reaches a preset number after counting the number of puffs with the puff detection sensor, the processor 160 may notify a user that the aerosol generating device 10 will end soon with at least one of a lamp, a motor, and a speaker.

In addition, although not illustrated in FIG. 1, the aerosol generating device 10 may be combined with a separate cradle with an aerosol generating system. For example, the cradle may be used to charge the battery 110 of the aerosol generating device 10. For example, the aerosol generating device 10 may receive power from a battery of the cradle to charge the battery 110 of the aerosol generating device 10 while being accommodated in an accommodation space in the cradle.

One embodiment may also be implemented in the form of a computer-readable medium including instructions executable by a computer, such as a program module executable by the computer. The computer-readable medium may be any available medium that can be accessed by a computer and includes both volatile and nonvolatile media, and removable and non-removable media. In addition, the computer-readable medium may include both a computer storage medium and a communication medium. The computer storage medium includes all of volatile and nonvolatile, and removable and non-removable media implemented by any method or technology for storage of information such as computer-readable instructions, data structures, program modules or other data. The communication medium typically includes computer-readable instructions, data structures, other data in modulated data signals such as program modules, or other transmission mechanisms, and includes any information transfer media.

Figure 2:
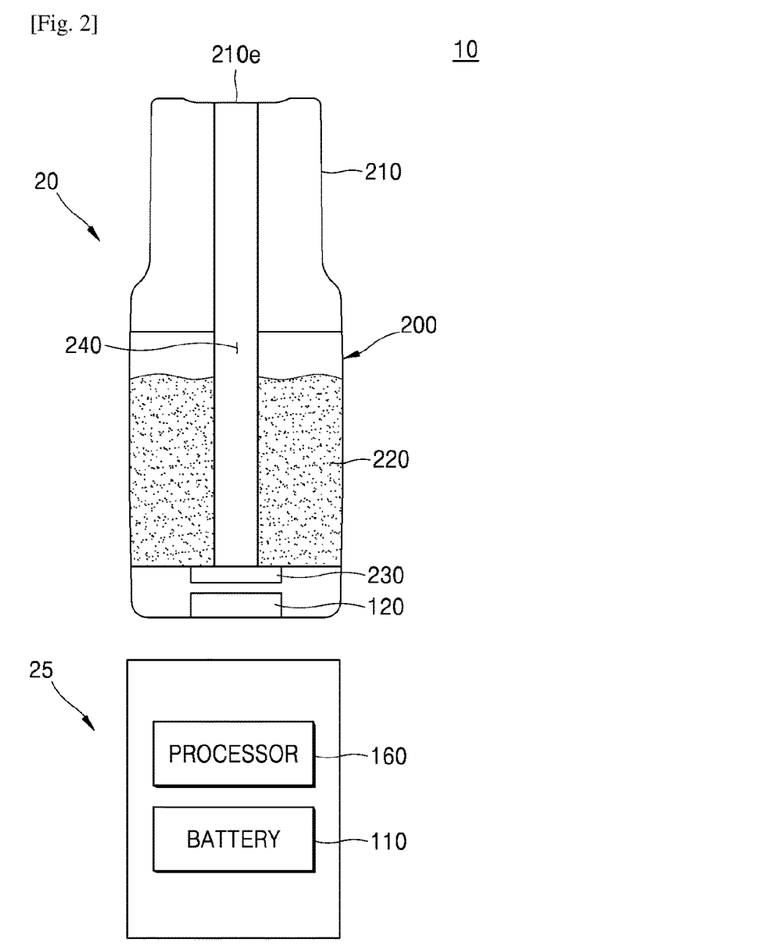
FIG. 2 is a diagram schematically illustrating an aerosol generating device according to an embodiment.

FIG. 2 is a diagram schematically illustrating an aerosol generating device according to an embodiment.

The aerosol generating device 10 according to the embodiment illustrated in FIG. 2 includes a cartridge 20 including an aerosol generating material, and a main body 25 supporting the cartridge 20.

The cartridge 20 may be coupled to the main body 25 in a state in which the aerosol generating material is accommodated therein. For example, the cartridge 20 may be coupled to the main body 25 by inserting at least a part of the cartridge 20 into the main body 25. In another example, the cartridge 20 may be coupled to the main body 25 by inserting at least a part of the main body 25 into the cartridge 20.

The cartridge 20 may be coupled to the main body 25 through at least one of a snap-fit method, a screw coupling method, a magnetic coupling method, and a press-fit method, but a coupling method of the cartridge 20 and the main body 25 is not limited to the examples described above.

In one embodiment, the cartridge 20 may include a mouthpiece 210 that is inserted into a user's mouth during inhalation of the user. In one embodiment, the mouthpiece 210 may be located at an end portion and the opposite end portion may be coupled to the main body 25 of the cartridge 20. The mouthpiece 210 may include an outlet 210e for discharging an aerosol generated from the aerosol generating material to the outside.

A pressure difference may occur between the outside and the inside of the cartridge 20 due to a user's inhalation or puff, and the aerosol generated inside the cartridge 20 may be discharged to the outside of the cartridge 20 through the outlet 210e due to a pressure difference between the inside and the outside of the cartridge 20. The user may receive the aerosol discharged to the outside of the cartridge 20 through the outlet 210e by inhaling the aerosol through the mouthpiece 210.

In one embodiment, the cartridge 20 may include a reservoir 220 that is located in an interior space of a housing 200 to accommodate an aerosol generating material. That is, the reservoir 220 may serve as a container to directly store an aerosol generating material. Alternatively, the reservoir 220 may include elements containing an aerosol generating material, such as sponge, cotton, cloth, or a porous ceramic structure.

The cartridge 20 may contain an aerosol generating material in any one of, for example, a liquid state, a solid state, a gaseous state, or a gel state. The aerosol generating material may include a liquid composition. For example, the liquid composition may include a liquid including a tobacco-containing material, a liquid including volatile tobacco flavor ingredients, and/or a liquid including a non-tobacco material.

For example, the liquid composition may include one component of water, solvents, ethanol, plant extracts, spice, flavoring, and vitamin mixtures, or a mixture of these components. The spice may include menthol, peppermint, spearmint oil, and various fruit flavoring ingredients but are not limited thereto. The flavoring may include ingredients capable of providing a user with a variety of savor or flavor. Vitamin mixtures may be a mixture of at least one of vitamin A, vitamin B, vitamin C, and vitamin E, but are not limited thereto. In addition, the liquid composition may include aerosol formers such as glycerin and propylene glycol.

For example, the liquid composition may include a glycerin and propylene glycol solution to which nicotine salts are added. The liquid composition may include two or more types of nicotine salts. Nicotine salts may be formed by adding suitable acids, including organic or inorganic acids, to nicotine. Nicotine may be a naturally generated nicotine or synthetic nicotine and may have any suitable weight concentration relative to the total solution weight of the liquid composition.

Acid for forming the nicotine salts may be appropriately selected in consideration of a blood nicotine absorption rate, an operating temperature of the aerosol generating device 10, savor or flavor, solubility, and so on. For example, the acid for the formation of nicotine salts may be a single acid selected from the group consisting of benzoic acid, lactic acid, salicylic acid, lauric acid, sorbic acid, levulinic acid, pyruvic acid, formic acid, acetic acid, propionic acid, butyric acid, valeric acid, caproic acid, caprylic acid, capric acid, citric acid, myristic acid, palmitic acid, stearic acid, oleic acid, linoleic acid, linolenic acid, phenylacetic acid, tartaric acid, succinic acid, fumaric acid, gluconic acid, saccharic acid, malonic acid or malic acid, or a mixture of two or more acids selected from the group, but is not limited thereto.

The aerosol generating device 10 may include the atomizer 120 that converts a phase of an aerosol generating material in the cartridge 20 to generate an aerosol.

In one example, the aerosol generating material stored or accommodated in the reservoir 220 may be supplied to the atomizer 120 by a liquid delivery means 230, and the atomizer 120 may atomize the aerosol generating material supplied from the liquid delivery means 230, thereby generating an aerosol. The liquid delivery means 230 may be, for example, a wick including at least one of cotton fiber, ceramic fiber, glass fiber, and porous ceramic, but is not limited thereto.

According to one embodiment, the atomizer 120 of the aerosol generating device 10 may convert a phase of an aerosol generating material through an ultrasonic vibration method of atomizing the aerosol generating material by using ultrasonic vibration.

For example, the atomizer 120 may include a vibrator that generates a vibration of a short cycle, and the vibration generated by the vibrator may be ultrasonic vibration. The frequency of the ultrasonic vibration may be about 100 kHz to about 3.5 MHz but is not limited thereto. The aerosol generating material supplied from the reservoir 220 to the atomizer 120 may be vaporized and/or made to particles by the vibration of a short cycle generated by the vibrator to be atomized into an aerosol.

The vibrator may include, for example, a piezoelectric ceramic, which may be a functional material capable of converting an electrical force to a mechanical force and vice versa by generating electricity (e.g., a voltage) in response to a physical force (e.g., a pressure) and generating a vibration (i.e., a mechanical force) in response to electricity. As power is applied to a vibrator, a vibration (i.e., a physical force) of a short cycle may be generated, and the generated vibration may break an aerosol generating material into small particles, thereby generating an aerosol.

The vibrator may be electrically connected to other components of the aerosol generating device 10 through an electrical connection member. For example, the vibrator may be electrically connected to at least one of the battery 110 and the processor 160 of the aerosol generating device 10, or a circuit of the aerosol generating device 10 through an electrical connection member, but components electrically connected to the vibrator are not limited to the examples described above.

The vibrator may receive a current or a voltage from the battery 110 through an electrical connection member to generate ultrasonic vibration, or an operation thereof may be controlled by the processor 160.

The electrical connection member may include at least one of, for example, a pogo pin and a C-clip, but the electrical connection member is not limited to the examples described above. In another example, the electrical connection member may include at least one of a cable and a flexible printed circuit board (FPCB).

In another embodiment (not illustrated), atomizer 120 may include a vibration receiver of a mesh shape or a plate shape which performs both a function of maintaining the best condition for absorbing an aerosol generating material without using a separate liquid delivery means 230 to convert the aerosol generating material into an aerosol and a function of transferring a vibration to the aerosol generating material to generate an aerosol.

Although FIG. 2 shows that the liquid delivery means 230 and the atomizer 120 are arranged in the cartridge 20, the present disclosure is not limited thereto. In another embodiment, the liquid delivery means 230 may be in the cartridge 20, and the atomizer 120 may be in the main body 25.

The cartridge 20 of the aerosol generating device 10 may include an outlet passage 240. The outlet passage 240 is formed inside the cartridge 20 and may be in fluid communication with the atomizer 120 and the outlet 210e of the mouthpiece 210. Accordingly, an aerosol generated by the atomizer 120 may flow through the outlet passage 240 and may be discharged to the outside of the aerosol generating device 10 through the outlet 210e to be delivered to a user.

For example, the outlet passage 240 may be provided in the inside of the cartridge 20 to be surrounded by the reservoir 220, but is not limited thereto.

Although not illustrated in the drawings, the cartridge 20 of the aerosol generating device 10 may include at least one air inlet passage through which air (hereinafter, "external air") outside the aerosol generating device 10 flows into the aerosol generating device 10.

The external air may be introduced into the outlet passage 240 or a space where an aerosol is generated by the atomizer 120 through at least one air inlet passage. The introduced external air may be mixed with vaporized particles generated from an aerosol generating material, and thus an aerosol is generated.

A cross section perpendicular to a longitudinal direction (i.e., lengthwise direction) of the cartridge 20 and the main body 25 may have a different shape according to embodiments, such as a circular shape, an oval shape, a square shape, a rectangular shape, and a polygonal shape. However, a cross-sectional shape of the aerosol generating device 10 is not limited to the shapes described above. Also, the present disclosure is not limited to a linearly extending structure of the aerosol generating device 10.

In another embodiment, the aerosol generating device 10 may be curved in a streamline shape for a user to easily hold the aerosol generating device 10 by hand or may be bent at a preset angle in a certain region. Also, the cross-sectional shape of the aerosol generating device 10 may vary along the longitudinal direction.

In addition, the aerosol generating device 10 may include a drive circuit for applying an alternating current (AC) voltage to a vibrator to drive the vibrator. In addition, the aerosol generating device 10 may further include a feedback circuit for detecting characteristics of the vibrator in real time and utilizing the detected characteristics of the vibrator to control the aerosol generating device 10. Hereinafter, the drive circuit and the feedback circuit are described in detail with reference to the drawings.

Figure 3:
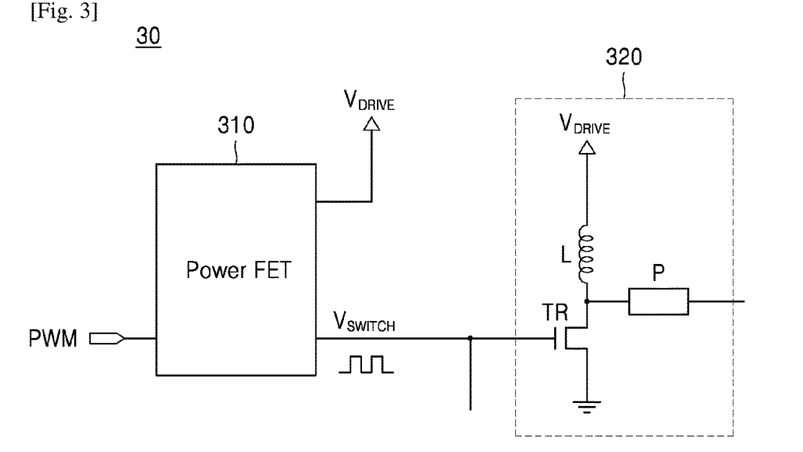
FIG. 3 is a circuit diagram illustrating a drive circuit according to an example embodiment.

FIG. 3 is a circuit diagram illustrating a drive circuit according to an example embodiment.

Referring to FIG. 3, the drive circuit 30 may include at least one power field effect transistor (FET) 310 and at least one switching circuit 320. In addition, the drive circuit 30 may include at least one input terminal to which a drive voltage $V_{DRIVE}$ is applied. For example, the drive voltage $V_{DRIVE}$ may be applied to the power FET 310 and/or the switching circuit 320 through at least one input terminal.

When the drive voltage $V_{DRIVE}$ is applied to the power FET 310, the power FET 310 may generate a switching voltage $V_{SWITCH}$ based on a PWM signal PWM. The switching voltage $V_{SWITCH}$ may indicate a voltage signal having a frequency corresponding to the PWM signal PWM and repeating a high level and a low level. The switching voltage $V_{SWITCH}$ generated by the power FET 310 may be used to control the switching circuit 320.

The switching circuit 320 may include an inductor L and a transistor TR. One terminal of the inductor L may be connected to an input terminal to receive the drive voltage $V_{DRIVE}$, and the other terminal of the inductor L may be connected to the transistor TR and a vibrator P. The transistor TR may be switched such that a current flowing through the inductor L is transferred to one of the vibrator P and the ground. The transistor TR may be an N-channel metal-oxide-semiconductor field-effect transistor (MOSFET). For example, the transistor TR may switch on and off a current flowing between a source terminal connected to the ground and a drain terminal connected to the inductor L in response to a signal received to a gate terminal. However, the present disclosure is not limited thereto, and the transistor TR may be a P-channel MOSFET or another type of semiconductor switching device.

An AC voltage may be applied to the vibrator P according to the switching voltage $V_{SWITCH}$ output by the transistor TR. Hereinafter, a process in which an AC voltage is applied to the vibrator P is described in detail with reference to FIG. 4.

Figure 4:
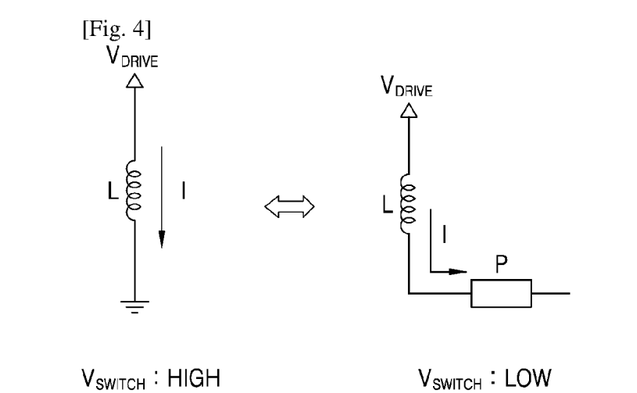
FIG. 4 illustrates diagrams showing an operation of a drive circuit according to an example embodiment.

FIG. 4 illustrates diagrams showing an operation of a drive circuit according to an example embodiment.

FIG. 4 illustrates equivalent circuits of a switching circuit (for example, the switching circuit 320 of FIG. 3) when the switching voltage $V_{SWITCH}$ is at a high level and when the switching voltage $V_{SWITCH}$ is at a low level.

When the switching voltage $V_{SWITCH}$ applied to the switching circuit is at a high level, a current may flow between a source terminal and a drain terminal of a transistor (for example, the transistor TR of FIG. 3). Accordingly, the inductor L may be connected to the ground, and thus, a current I may flow to the ground through the inductor L. In this case, the inductor L is also connected to the vibrator P, but the vibrator P has a non-zero load value (for example, capacitance) while resistance of the ground is zero or substantially close to zero. Thus, the current I flowing through the inductor may substantially proceed to the ground. In addition, because the current I flows through the inductor L, the inductor L may store energy corresponding to the current I.

When the switching voltage $V_{SWITCH}$ applied to the switching circuit is at a low level, a current may not flow between the source terminal and the drain terminal of the transistor. Accordingly, the energy stored in the inductor L may be supplied to the vibrator P.

The switching voltage $V_{SWITCH}$ repeats a high level and a low level according to a PWM signal. thus, the switching operation described above may be quickly performed. Accordingly, an AC voltage may be applied to the vibrator P such that the vibrator P generates ultrasonic vibration, and thus an aerosol generating material may be atomized.

Figure 5:
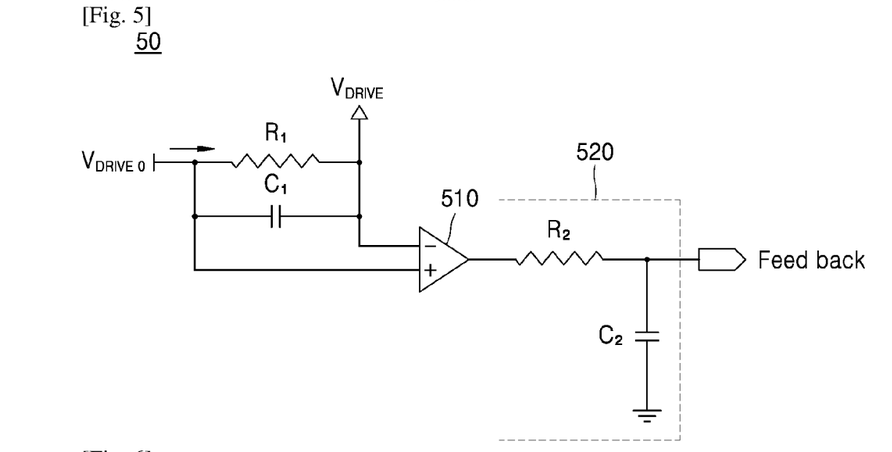
FIG. 5 is a circuit diagram illustrating a feedback circuit according to an embodiment.

FIG. 5 is a circuit diagram illustrating a feedback circuit according to an embodiment.

Referring to FIG. 5, a feedback circuit 50 outputs a voltage proportional to a current supplied to a drive circuit (for example, the drive circuit 30 of FIG. 3). The feedback circuit 50 may be positioned between a power supply circuit generating a drive voltage $V_{DRIVE0}$ and a drive circuit. The power supply circuit may include a power source. A drive voltage $V_{DRIVE0}$ generated by the power supply circuit may be a battery voltage, but is not limited thereto. The drive voltage $V_{DRIVE0}$ may correspond to a voltage obtained by boosting a battery voltage with a converter circuit or the like.

The feedback circuit 50 may include an operational amplifier 510. The operational amplifier 510 has a non-inverting input terminal to which the drive voltage $V_{DRIVE0}$ is applied, an inverting input terminal connected to the input terminal of the drive circuit, and an output terminal. In addition, the feedback circuit 50 may include a first resistor $R_1$ and a first capacitor $C_1$ connected in parallel between the non-inverting input terminal and the inverting input terminal. The operational amplifier 510 may amplify a voltage between the non-inverting input terminal and the inverting input terminal in a range acceptable by a processor (for example, the processor 160 of FIG. 1 or FIG. 2) and output the amplified voltage through the output terminal.

In one example, a vibrator may be included in a cartridge (for example, the cartridge 20 of FIG. 2), and the cartridge may be detachably coupled to a main body (for example, the main body 25 of FIG. 2). In this case, before the cartridge is coupled to the main body, the drive circuit may correspond to a state in which the vibrator P is not included in the drive circuit 30 of FIG. 3. Accordingly, a substantial load is not included in the drive circuit, and thus a current flowing through the first resistor $R_1$ to the input terminal of the drive circuit may be quite small. For example, the current flowing through the first resistor $R_1$ may be only tens to hundreds mA.

On the other hand, when the cartridge is coupled to the main body and the vibrator is driven, an AC voltage may be applied to the vibrator included in the cartridge by an operation of the drive circuit described above with reference to FIGS. 3 and 4, and the current flowing through the first resistor $R_1$ may be increased to 2 A or more.

According to the Ohm's law, the current flowing through the first resistor $R_1$ may be proportional to a voltage across the first resistor $R_1$. In addition, because the voltage across the first resistor $R_1$ corresponds to a voltage between the non-inverting input terminal and the inverting input terminal of the operational amplifier 510, the operational amplifier 510 may output a voltage proportional to the current flowing through the first resistor $R_1$, that is, the current supplied to the drive circuit.

For example, assume that a resistance value of the first resistor $R_1$ is about 0.01Ω, the current flowing through the first resistor $R_1$ is about 100 mA when the cartridge is not coupled to the main body, and the current flowing through the first resistor $R_1$ is about 2 A when the cartridge is coupled to the main body and the vibrator is driven. In this case, the voltage across the first resistor $R_1$ may be about 1 mV (=100 mA*0.01Ω) when the cartridge is not coupled to the main body, and the voltage across the first resistor $R_1$ may be about 20 mV (=2 A*0.01Ω) when the cartridge is coupled to the main body and the vibrator is driven.

The operational amplifier 510 may amplify the voltage across the first resistor $R_1$, for example, 50 times to be in a range acceptable by a processor. Accordingly, in the above example, a voltage output by the operational amplifier 510 may be about 50 mV when the cartridge is not coupled to the main body, and the voltage output by the operational amplifier 510 may be about 1000 mV when the cartridge is coupled to the main body and the vibrator is driven.

As such, the voltage output by the operational amplifier 510 changes depending on whether the cartridge is coupled to the main body. Thus, the aerosol generating device (for example, the aerosol generating device 10 of FIG. 1 or 2) may determine whether or not the cartridge is coupled to the main body, by using the voltage output by the operational amplifier 510.

In addition, the aerosol generating device may detect characteristics or a state of the vibrator by using the voltage output by the operational amplifier 510. When the characteristics of the vibrator are changed in the process of generating ultrasonic vibration in response to an AC voltage, a load value (for example, capacitance) of the vibrator is changed, and thus a current provided to a drive circuit is also changed. In one example, when a temperature of the vibrator increases, the capacitance and the load value of the vibrator may be increased. Accordingly, the current provided to the drive circuit may increase. In this regard, the aerosol generating device according to an embodiment may maintain the characteristics of the vibrator in an appropriate range by performing feedback control with the voltage output by the operational amplifier 510.

The first resistor $R_1$ may have a resistance value small enough to transfer the drive voltage $V_{DRIVE0}$ applied to the non-inverting input terminal to the input terminal of the drive circuit without a substantial voltage drop. That is, the drive voltage $V_{DRIVE0}$ may drop within a tolerance range. For example, when the drive voltage $V_{DRIVE0}$ is about 13 V and the current flowing through the first resistor $R_1$ is about 2 A, a resistance value of the first resistor $R_1$ may be about 0.01Ω. In this case, a voltage drop due to the first resistor $R_1$ may correspond to 2 A*0.01 Ω=0.02 V. Because this voltage drop is only about 0.15% of the drive voltage $V_{DRIVE0}$ of about 13 V, it can be considered that the drive voltage $V_{DRIVE0}$ is substantially equal to the drive voltage $V_{DRIVE}$ applied to the input terminal of the drive circuit.

In addition, the first capacitor $C_1$ may reduce noise while a voltage between the non-inverting input terminal and the inverting input terminal is amplified by the operational amplifier 510. As such, the feedback circuit 50 may feedback the characteristics of the vibrator without substantially affecting a process in which the drive voltage $V_{DRIVE}$ is applied to the drive circuit.

In addition, the feedback circuit 50 may further include an RC filter 520 that includes a second resistor $R_2$ and a second capacitor $C_2$ connected in series to an output terminal of the operational amplifier 510. The RC filter 520 outputs an output voltage of the feedback circuit 50 through the second capacitor $C_2$. Accordingly, noise may be further reduced in the process of outputting a voltage through the feedback circuit 50, and the aerosol generating device may be accurately controlled.

The processor may acquire a value corresponding to a voltage by converting the voltage output from the feedback circuit 50 into a digital value by using an analog-to-digital converter. The analog-to-digital converter may be included inside the processor or may be provided outside the processor. The processor may control a PWM signal applied to the drive circuit such that a value corresponding to the voltage is in a preset range. Hereinafter, a method of controlling the PWM signal by using the aerosol generating device or the processor is described in more detail with reference to FIGS. 6 to 8.

Figure 6:
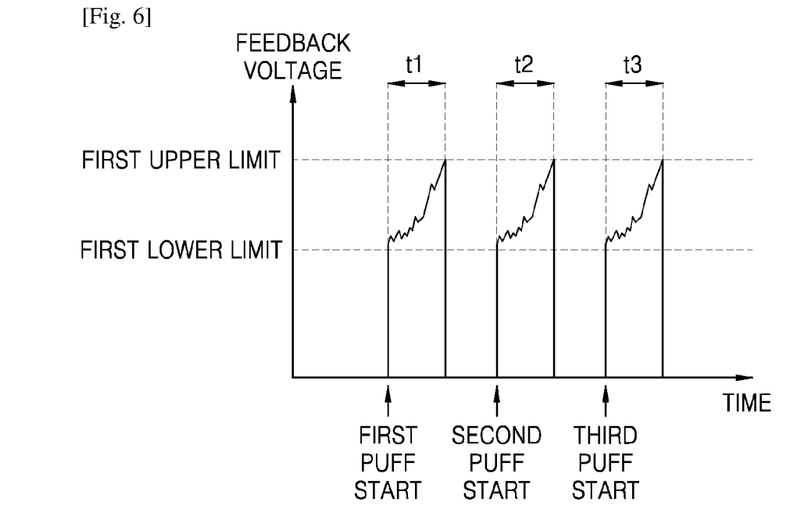
FIGS. 6 to 8 are diagrams illustrating a process of controlling an aerosol generating device based on a feedback voltage, according to an embodiment.
Figure 7:
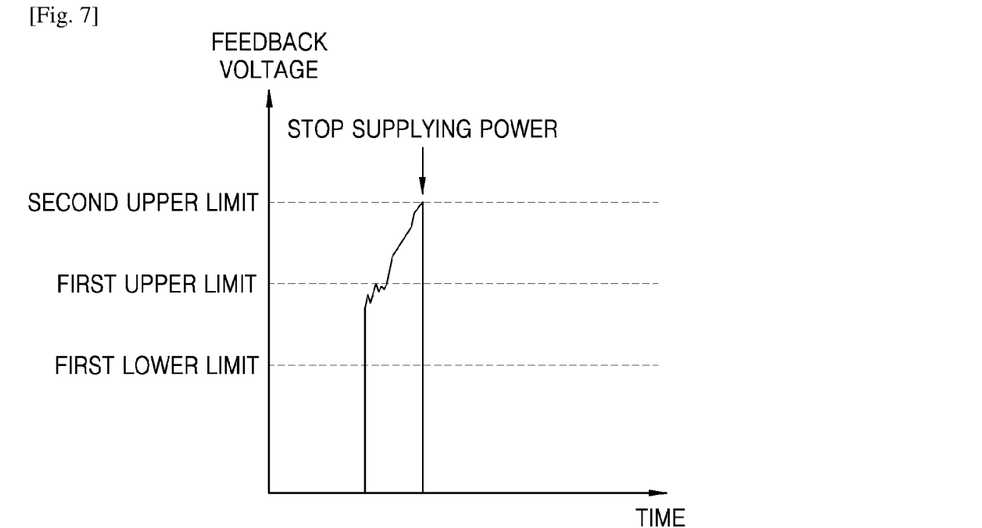
Figure 8:
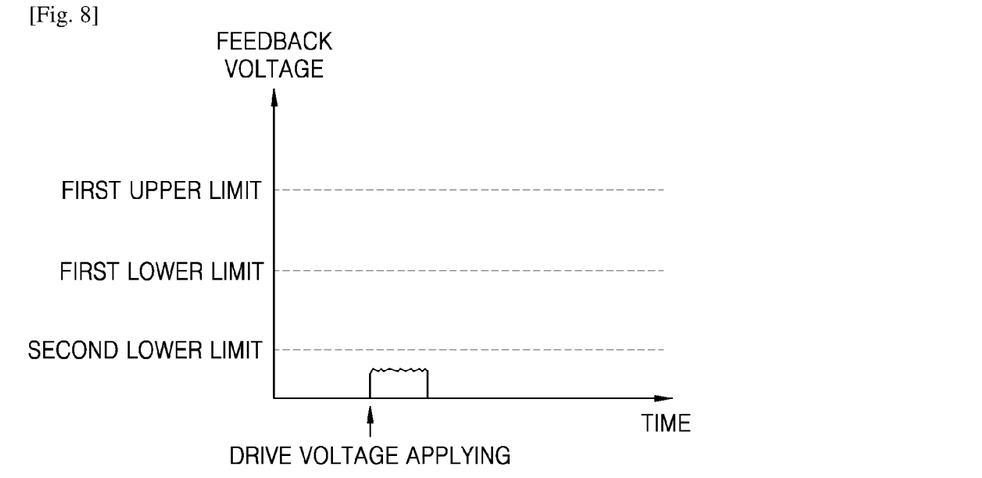

FIGS. 6 to 8 are diagrams illustrating a process of controlling an aerosol generating device based on a feedback voltage according to an embodiment.

Referring to FIG. 6, a change in feedback voltage over time in one example is illustrated. The feedback voltage may correspond to a voltage value obtained by converting an analog voltage output from a feedback circuit (for example, the feedback circuit 50 of FIG. 5) into a digital value by using an analog-to-digital converter. In addition, an aerosol generating device (for example, the aerosol generating device 10 of FIG. 1 or 2) includes a sensor for detecting a puff of a user. Also, a processor (for example, the processor 160 of FIG. 1 or 2) may apply a drive voltage and a PWM signal to a drive circuit (for example, the drive circuit 30 of FIG. 3) based on detection of a start of a user's puff.

As the drive voltage and the PWM signal are applied to the drive circuit, a feedback voltage may be output from the feedback circuit. As illustrated in FIG. 6, the aerosol generating device may control the PWM signal applied to the drive circuit such that the feedback voltage is included in a preset range defined by a first upper limit and a first lower limit.

In one example, the aerosol generating device or the processor may control the PWM signal such that the time taken for the feedback voltage to reach the first upper limit is substantially constant for each puff of the user. For example, as illustrated in FIG. 6, the aerosol generating device or the processor may control the PWM signal such that the time t1, t2, and t3 taken for the feedback voltage to reach the first upper limit respectively in a first puff, a second puff, and a third puff are substantially equal to each other. Accordingly, stable atomization having uniform characteristics for each puff may be performed.

In addition, although FIG. 6 illustrates an example in which the operation of the drive circuit is stopped when the feedback voltage reaches the first upper limit, the present disclosure is not limited thereto. When the feedback voltage reaches the first upper limit, the aerosol generating device may maintain the feedback voltage in the first upper limit or may continuously operate the drive circuit while controlling the feedback voltage to be less than the first upper limit.

Referring to FIG. 7, a change in feedback voltage over time in another example is illustrated. When the feedback voltage (i.e., a value corresponding to the output voltage of the feedback circuit) reaches a second upper limit higher than the first upper limit, the aerosol generating device or the processor may determine that an aerosol generating material is insufficient or that characteristics of the vibrator have changed. For example, when an aerosol generating material stored in the reservoir (for example, the reservoir 220 of FIG. 2) or a liquid delivery means (for example, the liquid delivery means 230 of FIG. 2) of a cartridge (for example, the cartridge 20 of FIG. 2) is exhausted, a temperature of the vibrator may increase faster than expected. As the temperature of the vibrator increases, a load value of the vibrator may increase, and thus a current supplied to the drive circuit connected to the vibrator may also increase. Accordingly, the feedback voltage may reach the second upper limit higher than the first upper limit.

In addition, the change in characteristics of the vibrator may indicate that the vibrator is in an overheated state or that the vibrator has been damaged because it is heated above the Curie temperature. When it is determined that the aerosol generating material is insufficient or the characteristics of the vibrator are changed, the aerosol generating device may stop at least one operation or output a notification that the cartridge or the vibrator needs to be replaced. For example, the aerosol generating device may disconnect power to the drive circuit or the vibrator. However, the present disclosure is not limited thereto, and the aerosol generating device may attempt to reduce the feedback voltage below the first upper limit by reducing a duty ratio of the PWM signal.

Referring to FIG. 8, a change in feedback voltage over time in another example is illustrated. In this example, it is assumed that a cartridge includes a reservoir and a vibrator, and a main body detachably coupled to the cartridge includes a drive circuit, a feedback circuit, and a processor. In this case, an aerosol generating device or a processor may determine that the cartridge is not coupled to the main body when a feedback voltage (a value corresponding to the output voltage of the feedback circuit) is less than the second lower limit that is lower than the first lower limit. When it is determined that the cartridge is not coupled to the main body, the aerosol generating device or the processor may stop at least one operation, and thus power may be prevented from being unnecessarily consumed.

In one example, the first upper limit may be about 900 mV, the first lower limit may be about 700 mV, the second upper limit may be about 1000 mV, and the second lower limit may be about 200 mV, but the present disclosure is not limited thereto and the limit values may also be set or other appropriate values. The first upper limit may be about 1700 mV, the first lower limit may be about 800 mV, the second upper limit may be about 2000 mV, and the second lower limit may be about 200 mV. In addition, thresholds such as the first upper limit, the first lower limit, the second upper limit, and the second lower limit may be fixed or may be dynamically changed. For example, the aerosol generating device may dynamically adjust the thresholds by considering the fact that characteristics of the vibrator may change as a smoking operation using the vibrator is repeated.

As described above, according to an embodiment of the present disclosure, thresholds (for example, the first upper limit and the first lower limit) for determining an optimal state of the aerosol generating device may be set to be different from thresholds (for example, the second upper limit and the second lower limit) for determining an inoperable state of the aerosol generating device may not be performed. Accordingly, the aerosol generating device is not just controlled to be in an operable state but may be controlled to be in an optimal state in which stable atomization of an aerosol may be performed.

Figure 9:
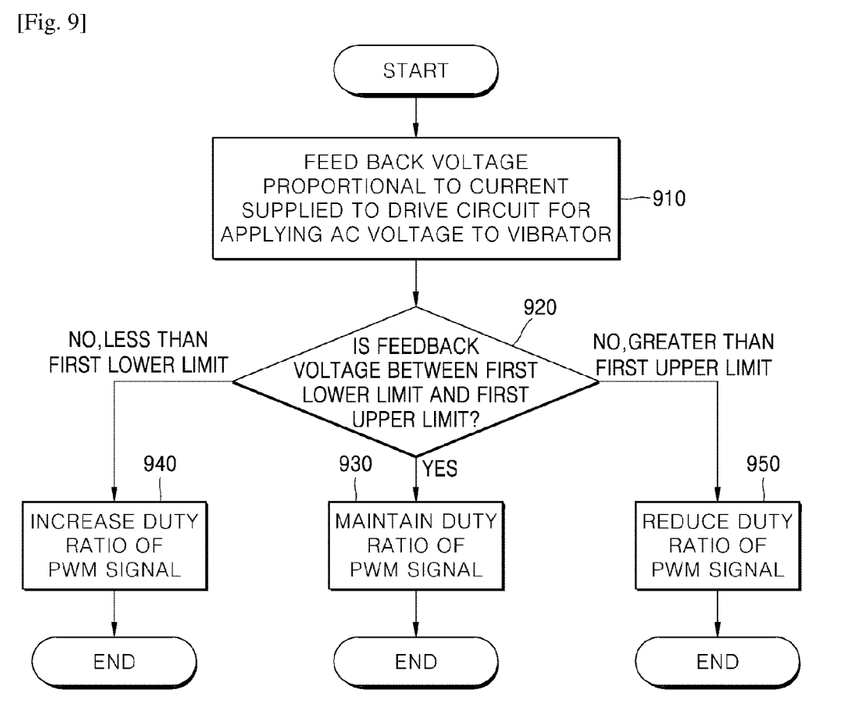
FIG. 9 is a flowchart illustrating a method of operating an aerosol generating device, according to an embodiment.

FIG. 9 is a flowchart illustrating a method of operating an aerosol generating device, according to an embodiment.

Referring to FIG. 9, the method of operating the aerosol generating device includes operations processed by the aerosol generating device 10 illustrated in FIGS. 1 and 2. Therefore, it can be seen that, although omitted below, the above description on the aerosol generating device 10 of FIGS. 1 and 2 is also applied to the method of operating the aerosol generating device illustrated in FIG. 9.

In operation 910, an aerosol generating device may feedback a voltage proportional to a current supplied to a drive circuit (for example, the drive circuit 30 of FIG. 3) for applying an AC voltage to a vibrator by using a feedback circuit (for example, the feedback circuit 50 of FIG. 5).

In operation 920, the aerosol generating device may determine whether a value corresponding to the output voltage of the feedback circuit is between a first upper limit and a first lower limit. The aerosol generating device may perform operation 930 when the value corresponding to the output voltage of the feedback circuit is between the first upper limit and the first lower limit. Otherwise, the aerosol generating device may perform operation 940 when the value corresponding to the output voltage of the feedback circuit is less than the first lower limit, and perform operation 950 when the value corresponding to the output voltage of the feedback circuit is greater than the first upper limit.

In operation 930, the aerosol generating device may maintain a duty ratio of a PWM signal. When the value corresponding to the output voltage of the feedback is between the first upper limit and the first lower limit, the vibrator is being driven in the optimal state for stable atomization, and thus the aerosol generating device may maintain the current state. However, the present disclosure is not limited thereto, and instead of maintaining a duty ratio of the PWM signal, the aerosol generating device may adjust the duty ratio of the PWM signal such that the feedback voltage (i.e., the value corresponding to the output voltage of the feedback) is adjusted to a more appropriate value (for example, an intermediate value between the first upper limit and the first lower limit, or the first upper limit).

In operation 940, the aerosol generating device may increase the duty ratio of the PWM signal. The aerosol generating device may increase power supplied to the drive circuit by increasing the duty ratio of the PWM signal. Accordingly, the value corresponding to the output voltage of the feedback circuit may be increased to be in an appropriate range (that is, between the first upper limit and the first lower limit).

If the value corresponding to the output voltage of the feedback circuit is still below the second lower limit that is lower than the first lower limit even after the aerosol generating device has increased the duty ratio of the PWM signal within a possible range, the aerosol generating device may stop supplying power to the drive circuit or may determine that a cartridge is not coupled to a main body.

In operation 950, the aerosol generating device may reduce the duty ratio of the PWM signal. The aerosol generating device may reduce power supplied to the drive circuit by reducing the duty ratio of the PWM signal. Accordingly, the value corresponding to the output voltage of the feedback circuit may be reduced to be in an appropriate range (that is, between the first upper limit and the first lower limit).

If the value corresponding to the output voltage of the feedback circuit is still above the second upper limit that is greater than the first upper limit even after the aerosol generating device has reduced the duty ratio of the PWM signal within a possible range, the aerosol generating device may determine that an aerosol generating material is insufficient or characteristics of the vibrator have changed and may stop at least one operation or output a notification that the cartridge or the vibrator needs to be replaced.

The descriptions on the embodiments described above are merely examples, and it will be understood by those skilled in the art that various changes and equivalents thereof may be made. Therefore, the scope of the disclosure should be defined by the appended claims, and all differences within the scope equivalent to those described in the claims will be construed as being included in the scope of protection defined by the claims.

The invention claimed is:

1. An aerosol generating device comprising:
a reservoir storing an aerosol generating material;
a vibrator configured to generate ultrasonic vibration to atomize the aerosol generating material into an aerosol;
a drive circuit configured to apply an alternating current (AC) voltage to the vibrator;
a feedback circuit configured to output a voltage proportional to a current supplied to the drive circuit; and
a processor configured to control a pulse width modulation (PWM) signal applied to the drive circuit, such that a value corresponding to the voltage is in a preset range defined by a first upper limit and a first lower limit,
wherein the feedback circuit comprises:
an operational amplifier comprising a non-inverting input terminal to which a drive voltage is applied, an inverting input terminal connected to an input terminal of the drive circuit, and an output terminal; and
a first resistor and a first capacitor which are connected in parallel between the non-inverting input terminal and the inverting input terminal, and
wherein the operational amplifier amplifies a voltage between the non-inverting input terminal and the inverting input terminal in a range acceptable by the processor and outputs the amplified voltage through the output terminal.

2. The aerosol generating device of claim 1, further comprising:
a sensor configured to detect a puff of a user,
wherein the processor applies the PWM signal to the drive circuit based on detection of a start of the puff and controls the PWM signal such that a time taken for the value corresponding to the voltage to reach the first upper limit is substantially constant for each puff of the user.

3. The aerosol generating device of claim 1, further comprising:
a cartridge including the reservoir and the vibrator; and
a main body including the drive circuit, the feedback circuit, and the processor, and detachably coupled to the cartridge,
wherein, based on the value corresponding to the voltage being less than a second lower limit that is lower than the first lower limit, the processor determines that the cartridge is not coupled to the main body.

4. The aerosol generating device of claim 1, wherein, based on the value corresponding to the voltage reaching a second upper limit greater than the first upper limit, the processor determines that the aerosol generating material is insufficient or that characteristics of the vibrator are changed.

5. The aerosol generating device of claim 1, wherein the first resistor has a resistance value small enough to transfer the drive voltage applied to the non-inverting input terminal to the input terminal of the drive circuit without a substantial voltage drop.

6. The aerosol generating device of claim 1, wherein the feedback circuit further comprises:
an RC filter including a second resistor and a second capacitor which are connected in series to the output terminal, and configured to provide an output voltage of the feedback circuit through the second capacitor.

7. The aerosol generating device of claim 1, wherein the processor acquires the value corresponding to the voltage by converting the voltage output from the feedback circuit into a digital value by using an analog-to-digital converter.

8. The aerosol generating device of claim 1, wherein the drive circuit comprises:
an input terminal to which a drive voltage is applied;
an inductor having a terminal connected to the input terminal;
a transistor connected to another terminal of the inductor and configured to perform switching such that a current flowing through the inductor flows to one of the vibrator and a ground; and
a power field-effect transistor (FET) configured to generate a switching voltage based on the PWM signal,
wherein the AC voltage is applied to the vibrator as the transistor performs the switching according to the switching voltage.

* * * * *